J. PALMER.
Corn-Planter.
No. 48,991.
Patented July 25, 1865.
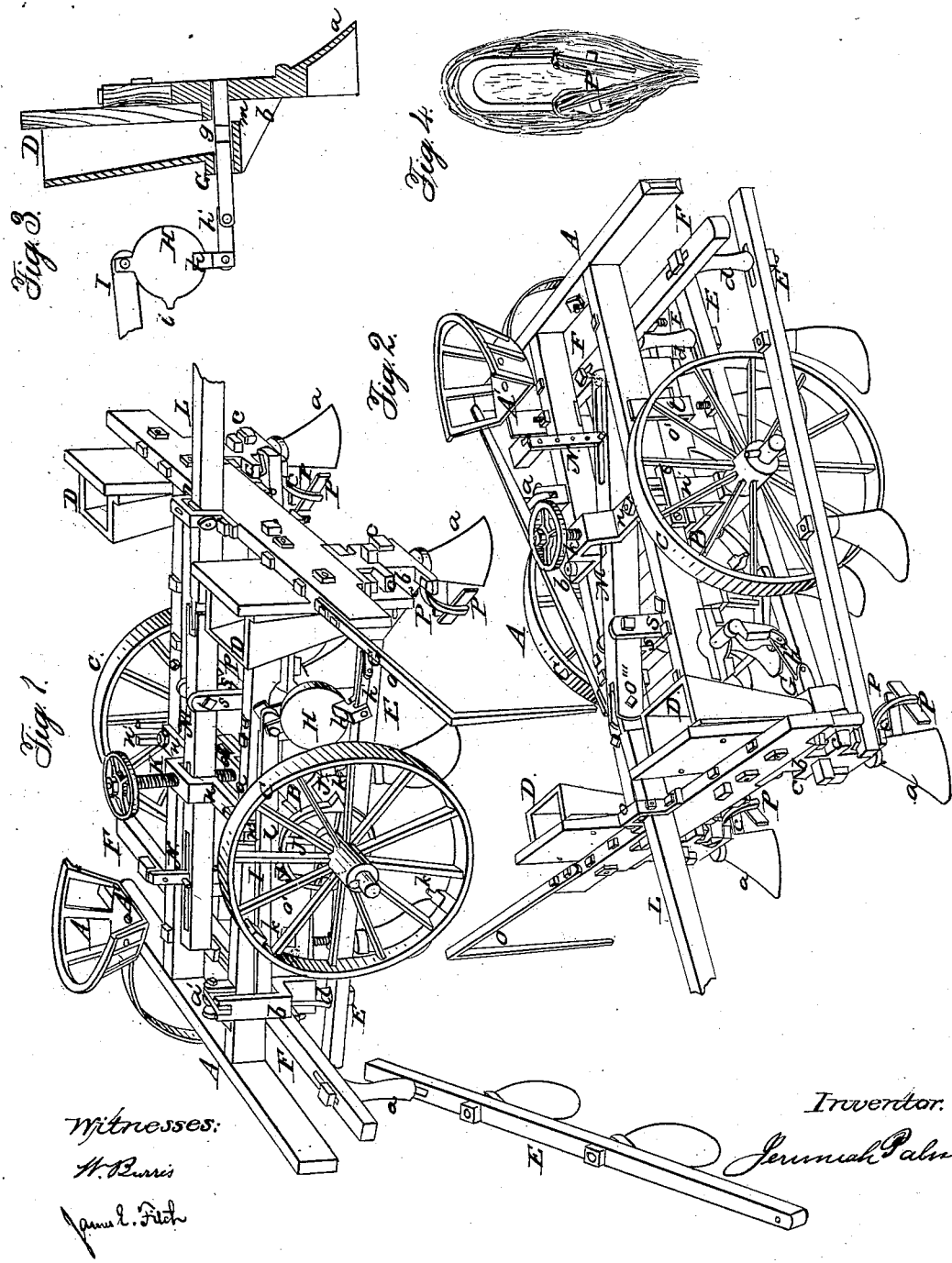
Witnesses:
H. Burris
James E. Fitch
Inventor.
Jeremiah Palmer

UNITED STATES PATENT OFFICE.

JEREMIAH PALMER, OF ORISKANY, NEW YORK.

IMPROVEMENT IN COMBINED CORN-PLANTER AND CULTIVATOR.

Specification forming part of Letters Patent No. 48,991, dated July 25, 1865.

*To all whom it may concern:*

Be it known that I, JEREMIAH PALMER, of Oriskany, in the county of Oneida and State of New York, have invented a new and Improved Machine for Planting and Cultivating Grain, Cotton, and other Seeds; and I do hereby declare the following to be a full, clear, and exact description of the construction and operation of the same, reference being had to the accompanying drawings, making a part of this specification, in which—

Figure 1 is a perspective view, exhibiting the front part of the machine to the right. Fig. 2 is also a perspective view exhibiting the front part of the machine to the left; Fig. 3, a detailed vertical sectional view of hopper in which grain, cotton, and other seed are placed, and section of feed bar or valve for receiving and discharging same by means of a slot, as well as section of the one-tooth cog-wheel and lever for operating same; Fig. 4, top view of furrow boards or plates inclining inwardly or at an angle behind the front furrow drill teeth.

Like letters indicate like parts in all figures of the drawings.

The nature of my improvement consists, first, operating the feed bar or valve in the hopper by means of a one-tooth cog-wheel connecting therewith at the bottom and a lever connecting with the wheel at the top, which lever is operated on by a three-tooth cog-wheel attached to the box or hub of one of the large or main wheels, the latter having three outwardly-projecting cogs, the revolution of the two combined producing a reciprocating motion to the feed-bar, so that whatever seed that fails to be caught by a slot in the feed-bar in the forward motion is readily and quickly taken up to be discharged in the motion backward, every revolution of the main or large wheel bringing the outwardly-projecting cogs in contact with the one-tooth cog-wheel, and thereby producing the forward motion, and at the same time the three-tooth cog-wheel on the box or hub of the large one giving the backward motion; secondly, in relation to cultivating after planting, depressing or elevating the main wheels by means of a vertical hand-screw connected with the axle, so that the desired depth may be obtained to the teeth in running over the ground, as well as elevating the body or frame of the machine, whereby the teeth may be raised sufficiently above the ground as to enable the same to be transported about on the main wheels with facility and ease; thirdly, when the machine is crossing hollows, uneven surfaces of ground, ascending or descending hills, depressing or elevating that part of the tongue in the neck-yoke by means of a foot-lever connecting with it by a pivot, the placing of the foot of the operator or driver on the lever depresses it, which depresses the tongue correspondingly, raising it and elevating the tongue in a like manner, thus enabling the teeth to adapt themselves without varying in depth to whatever condition of ground the machine may be traversing; fourthly, adjusting the bars to which the teeth are attached at the back part of the machine by means of screw-rods passing vertically through slots in a transverse bar on the machine, and then through cast-iron shape rollers connecting with the bars, whereby the desired width of the rows may be obtained; fifthly, placing side boards or plates at an angle, or inwardly inclined behind the front furrow-drill teeth, so that the earth as it is furrowed is thrown in between the plates or boards, thus forming an inclosure around the seed, and as the broad surfaces of the wheels pass over the hills or inclosures thus made the seed becomes completely covered. If left open, as is generally the case, the wheels pass in between the dirt sides thrown up behind by the furrow-teeth, and hence the seed is not covered as well as it should be.

The object, therefore, is to close in the dirt sides by plates, as above arranged, so that the seed shall be effectually covered.

The improvements above enumerated I will designate more particularly by letters in the drawings, the construction and operation of which I will proceed to describe.

A is a longitudinal frame, substantially constructed of timber B, the axle on which the frame is supported having two large wheels, C C, for propelling the same about.

D D are the hoppers. They are made of zinc or tin, and fastened by screws or otherwise to tolerably stout planking of a suitable width, which, in turn, is secured by bolts and nuts to the inner side of the front transverse bar (making a part of the frame) on the projecting parts beyond the longitudinal bars, and in immediate proximity to them.

*a a* are the front furrow-drill teeth, and are of cast-iron plated with steel. They are secured properly to the angular-shaped pieces *b b*, (seen in Fig. 3,) out from which project lips or flanges *c c*, above and below, on each side of which, and fitting in between the lips or flanges, are the cultivating-tooth bars E E E E, secured by screws and nuts, the screws passing through the lips or flanges and bars, (seen clearly in Figs. 1 and 2,) the front end of the outer bar in Fig. 1 being shown as removed from between the lips or flanges and carried around to one side. The two inner bars form the apex of a triangle at the back part of the frame. The outer ones form a triangle with the inner ones, the apex of which is at the front part of the frame, around the angular pieces above referred to, the two constituting a double triangle, which, with the proper number of teeth, will make two rows. To obtain the desired width of the rows, a transverse bar, F, is secured under the longitudinal bars near the outer or back transverse bar of the frame by bolts and nuts, with slots, through which pass screw-rods, projecting through cast-iron shape rollers *d d d d* underneath, to and through slots in the back ends of the cultivating-tooth bars, and then secured by nuts, which can be tightened or loosened at will in adjusting the bars, a free lateral movement being allowed to the screw-rods in the slots.

It will thus be seen that the tooth-bars can be readily adjusted and detached, when it is desired to use the machine as a planter, by removing the screw bolts and nuts.

The hoppers rest on the angular pieces *b*, herein referred to, (seen in Fig. 3,) the same being bolted under the transverse head-bar of the frame.

G G are the feed bars or valves, projecting horizontally through slots in the angular pieces, each bar of which has a slot, *g*, (seen in Fig. 3,) of the proper size to receive the corn, cotton, or other seed that may be placed into the hoppers.

H is the one-tooth cog-wheel, fixed on the end of a shaft, which is secured to the longitudinal bars underneath by plates with screw bolts and nuts. This wheel is placed between the large wheel and the side of one of the longitudinal bars on the right side, looking forward, (seen in Fig. 1,) and has an outward projection, *h*, at the bottom, a small link-bar, *h'*, being secured to it by a pivot at one end, the other end being secured to the feed-bar in a like manner. The end of the shaft on the other side of the frame is of a crank-form, and is connected to the feed-bar in a manner like the above. The object of connecting the feed-bars in this way to the wheel and crank part of the shaft, instead of directly, is to allow a free-and-easy reciprocating motion to the feed-bars when operating in the slots in the angular pieces. This may be accomplished in another way by a vertical slot in the outward projection of the wheel, the feed-bar, having a pivot or pin inserted in it and secured by a head-nut, and thus allow a free up-and-down movement therein. The tooth or cog *i* on this wheel is in a diametrical line with its center on the side toward the axle. (Seen in Fig. 3.) Connecting to and secured to an upward projection on the top of this wheel by a small pivot is the lever I, extending over and beyond the three-tooth cog-wheel on the hub or box of the main one. The three cogs or teeth *j j j* of this wheel J are equidistant around the periphery of it. It may be cast whole with the hub or box, or separately. The felly of the main wheel has also three cogs, *k k k*, but placed outwardly, equidistant around, and secured underneath by screw-bolts with nuts countersunk from the outside of the felly.

The lever herein described rests on the three-tooth cog-wheel having a notch or shoulder, *l*, so that the wheel, as it is revolved with the main one, the cogs coming in contact with the shoulder or notch, pushes it forward, and, turning the one-tooth cog-wheel slightly to the right, brings the feed-bar back to its proper position to receive the seed in the slot (herein referred to) from the hopper, and the cogs on the main one, coming in contact with the one-tooth cog-wheel, projects the feed-bar forward, the seed being carried in the slot with it to the slot *m* (seen in Fig. 3) in the angular piece, and discharged thence through into the ground. If the seed fails to get in the slot when the bar is going forward, the backward motion catches it. This motion is kept up alternately back and forth, the feed-bars discharging the seed at the proper point and time. The lever serves a twofold purpose. It may be used as a brake by the driver in his seat A' pressing down upon it with his foot, the shoulder catching the cog of the wheel on the box or hub, and thus preventing any unnecessary operation or movement of the feed-bars, or checking the main wheels when the machine is out of gear and descending a hill. It is thrown out of gear by raising the lever and placing the under notched end of it over the small movable bar *a'*, which is pivoted to an upright projection on the top of the bar of the frame, resting in a notched cast-iron plate, *v*, outside of the same.

K is the vertical hand-screw. It is connected to the axle by two plates, *a''*, bolted through from the top, the upper one being a bearing-plate for the screw to operate against when elevating the axle, the screw having a head or cap, sufficient room being allowed for it to move around when pressing against either of the upper or lower plates. A cast-iron plate, *n*, is bolted across on the top of the frame, through which the screw passes and has a bearing. The plate is elbowed or raised in the center over the foot-lever to allow a free movement to the latter. The ends of the plate have a tenon projecting out from the frame and fitting into vertical slots in bars n', which are secured to the axle close up to the frame. The object of this is to guide and keep the axle steady when depressing or elevating it to obtain the desired depth of ground to the teeth, which is done and ascertained by the operator taking hold of a wheel on the screw from his seat in the spring-chair behind. This screw will elevate the frame sufficiently from the ground as to enable it to be transported about with ease on the large wheels.

L is the tongue. It rests in an opening or slot, l', made from the top side of the front transverse bar of the frame, with a double cast-iron bracket-plate, o, placed over the top of it and bolted to the top of the bar. A small pin or bolt, o', passes through this plate over the top of the tongue, which at this point is made slightly hollowing to allow a free movement to it in the space thus formed. The tongue extends a little beyond the front bar, and terminates in its connection with the foot-lever M, a universal joint being formed and a pin or bolt, o''', securing the two together. The lever is secured a little beyond this joint by upright bracket-plates s s on each side of it, bolted to a cross-bar, p, which is bolted under the frame. A small bolt passes through the plates and lever, which serves as a fulcrum to the lever to operate on. The lever extends a little beyond the spring-seat from the joint. A slot is made in it under the elbowed cross-plate, (herein referred to,) through which passes the vertical hand-screw. Near the terminus of the lever is another slot, through which passes the vertical guide-bar N, bolted to a cross-bar which is joined at each end to sliding side bars, O', immediately under the longitudinal bars of the frame. A cast-iron bracket-plate, t, bolted to each side of the bars, supports the sliding frame thus formed. The sliding bars have their ends notched or shouldered, so that the intervening space between the longitudinal bars and the axle, made by the depression or elevation of it, is filled up by the notched or shouldered part of the bars, which are shoved in between. The notches, being close up to the axle when the same is tightly screwed up, strengthen and brace it. The notches are not limited in number. They may be increased in size according to the depth of the sliding bars and the intervening spaces between the axle and bars above. The sliding frame serves a twofold purpose—to keep the axle steady and firm, while the guide keeps the foot-lever to the position desired by the operator.

When the machine is going over uneven surfaces of ground, such as hollows, ascending or descending hills, and to prevent the front part of the machine heading too much or the teeth deviating from the gaged depth, as well as relieving the horses from the strain thus caused by the irregular running of the machine, the tongue is depressed or elevated at the point in the neck-yoke, according to the condition of the ground over which the machine is traversing, by the operator simply pressing his foot down on the lever, a pin being slipped over it through a hole in the guide-bar, which holds it to the position desired. There are a number of holes in this bar, so that a suitable one is easily found for the pin to hold the lever to whatever point it may be depressed. The tongue is elevated by raising the lever and putting the pin under it and through one of the holes.

O is a transverse bar placed close up behind the hoppers or on the top of the front cross-bar, with guides projecting downward. The object of this is to enable the operator to keep the rows of a uniform width, the guides following in the furrows previously made.

P P are the furrow boards or plates, arranged in the shape of an angle behind the front furrow-drill teeth. They are attached to curved bars, which are secured to and above the lower lips or flanges of the angular pieces by bolts and nuts. The dirt that is thrown up around the sides of the teeth falls in between these plates or boards, forming an inclosure to the seed as fast as it is discharged from the hopper, and as the broad surfaces of the wheels pass along over it the inclosures or hills thus formed from the pressure or weight of the wheels close in and entirely cover the seed.

I omitted to state how the lever (which produces the backward motion to the feed-bar) is held down over the three-tooth cog-wheel. If the feed-bar should forcibly become choked by broken pieces of seed, (which is very improbable,) and thus impair or stop the operation of the feed-bars by the lever being thrown up, and thereby fail to perform its functions, the lever is notched or cut out on the side near the end facing the inside of the supporting-plate v, which also serves to support the sliding frame herein described. It is bolted under the bar of the frame, and projects sufficiently from it for the lever to operate in between the two. The back edge of this plate is intended to be notched or cut out, so that the lever, from the notch made in it, will catch in the notch on the edge of the plate, and thus prevent its being thrown up, the striking of the cogs on the wheel attached to the hub against the shoulder of the lever pushing it forward and freeing the feed-bars from the choking.

I do not confine myself to the limited number of cogs on the wheel nor to their exact positions, as herein specified. They may vary in number and position, and still accomplish the same result. I have fixed the number and position as the most suitable for operating the feed-bars.

The frame can be elevated sufficiently high by the vertical hand-screw as to clear the teeth entirely from the tops of the corn, not injuring them in the slightest manner when turning around or driving over the field.

Having thus fully described my invention, what I claim therein as new, and desire to secure by Letters Patent, is—

1. The movement of the feed-bars G G in the hoppers by means of three outwardly-projecting cogs, k k k, on the main wheel, the three-tooth cog-wheel J, notched lever I, and one-tooth cog-wheel, the whole combined and operating substantially in the manner and for the purpose herein set forth.

2. The lever I, in combination with the three-tooth cog-wheel J, for breaking the revolution of the wheels or stopping the operation of the feed-bars, substantially in the manner and for the purpose herein set forth.

3. The tongue L and lever M, in combination with the bracket-plate o. joint o''', fulcrum S, and guide N, when constructed and operating as and for the purpose herein set forth.

4. The vertical hand-screw K, cross-plate n, bearing-plates a'', in combination with the axle B, open-slotted guides n' n', for the depression or elevation of the wheels, substantially in the manner and for the purpose herein set forth.

5. The notched sliding frame O' and guide N, in combination with the axle B and foot-lever M, substantially in the manner and for the purpose herein set forth.

JEREMIAH PALMER.

Witnesses:
W. BURRIS,
JAMES E. FITCH.